United States Patent
Prihed et al.

(10) Patent No.: US 8,577,402 B2
(45) Date of Patent: Nov. 5, 2013

(54) METHOD FOR AVOIDING OVERFLOW OF MULTIPLICATION OF ROOTS-OF-UNITY BY USING OVERFLOW SAFE APPROXIMATED VALUES TABLE

(75) Inventors: Assaf Prihed, Ness Zionna (IL); Shai Kalfon, Hod Hasharon (IL); Eran Goldstein, Raanana (IL)

(73) Assignee: LSI Corporation, San Jose, CA (US)

(*) Notice: Subject to any disclaimer, the term of this patent is extended or adjusted under 35 U.S.C. 154(b) by 392 days.

(21) Appl. No.: 12/972,692

(22) Filed: Dec. 20, 2010

(65) Prior Publication Data
US 2012/0157008 A1 Jun. 21, 2012

(51) Int. Cl.
*H04B 7/00* (2006.01)
(52) U.S. Cl.
USPC ..... 455/500; 455/517; 455/412.1; 455/412.2; 455/422.1; 455/426.1; 370/328; 370/329; 370/343; 370/338

(58) Field of Classification Search
USPC ........ 455/500, 517, 412.1, 412.2, 422.1, 403, 455/426.1, 426.2; 370/328, 329, 343, 338
See application file for complete search history.

(56) References Cited

U.S. PATENT DOCUMENTS

| 6,073,100 A | 6/2000 | Goodridge, Jr. ............... 704/258 |
| 6,073,154 A | 6/2000 | Dick ............................. 708/401 |
| 6,360,204 B1* | 3/2002 | Li et al. ......................... 704/500 |
| 6,654,777 B1* | 11/2003 | Fossum et al. ................. 708/500 |
| 2002/0101939 A1 | 8/2002 | Sundaresan ..................... 375/316 |
| 2007/0192104 A1 | 8/2007 | Blewett et al. ................. 704/256 |

* cited by examiner

*Primary Examiner* — Keith Ferguson
(74) *Attorney, Agent, or Firm* — Christopher P. Maiorana, PC

(57) ABSTRACT

An apparatus including a processor, a computer readable storage medium, and a lookup memory. The computer readable storage medium generally contains computer executable instruction that when executed by the processor perform operations involving fixed point multiplication. The lookup memory generally stores values used in the fixed point multiplication. The values stored in the lookup memory are approximated based upon a predetermined value to prevent overflow in the fixed point multiplication.

20 Claims, 12 Drawing Sheets

| VALUE TO BE RERPRESENTED | REGULAR TABLE FIXED POINT REPRESENTATION (Q15) | | INVENTED TABLE EXAMPLE FIXED POINT REPRESENTATION (Q15), ε=1.5/2^15 | |
|---|---|---|---|---|
| | IMAG | REAL | IMAG | REAL |
| $e^{0\Pi/32}$ | 32767 | 0 | 32767 | 0 |
| $e^{1\Pi/32}$ | 32610 | 3212 | 32609 | 3212 |
| $e^{2\Pi/32}$ | 32138 | 6393 | 32137 | 6392 |
| $e^{3\Pi/32}$ | 31357 | 9512 | 31356 | 9512 |
| $e^{4\Pi/32}$ | 30274 | 12540 | 30272 | 12539 |
| $e^{5\Pi/32}$ | 28899 | 15447 | 28897 | 15446 |
| $e^{6\Pi/32}$ | 27246 | 18205 | 27244 | 18204 |
| $e^{7\Pi/32}$ | 25330 | 20788 | 25329 | 20787 |
| $e^{8\Pi/32}$ | 23170 | 23170 | 23169 | 23169 |
| $e^{9\Pi/32}$ | 20788 | 25330 | 20787 | 25329 |
| $e^{10\Pi/32}$ | 18205 | 27246 | 18204 | 27244 |
| $e^{11\Pi/32}$ | 15447 | 28899 | 15446 | 28897 |
| $e^{12\Pi/32}$ | 12540 | 30274 | 12539 | 30272 |
| $e^{13\Pi/32}$ | 9512 | 31357 | 9512 | 31356 |
| $e^{14\Pi/32}$ | 6393 | 32138 | 6392 | 32137 |
| $e^{15\Pi/32}$ | 3212 | 32610 | 3212 | 32609 |

FIG. 11

METHOD FOR AVOIDING OVERFLOW OF MULTIPLICATION OF ROOTS-OF-UNITY BY USING OVERFLOW SAFE APPROXIMATED VALUES TABLE

FIELD OF THE INVENTION

The present invention relates to roots-of-unity multiplication generally and, more particularly, to a method and/or apparatus for avoiding overflow of multiplication of roots-of-unity by using overflow safe approximated values table.

BACKGROUND OF THE INVENTION

A root-of-unity, or De Moivre number, is any complex number that equals 1 when raised to some integer power. Roots-of-unity are used in many branches of mathematics, and are especially important in number theory, field theory, and the discrete Fourier transform. Roots-of-unity multiplication is used in digital signal processing (DSP). In many cases, multiplying two roots-of-unity represented in fixed-point format can create an overflow in the result. In some conventional processors with no saturation hardware (HW) mechanism available, the resulting error can be large.

Conventional solutions include implementing a control code for checking each roots-of-unity multiplication result (i.e., to check the absolute value of the result). The absolute value for roots-of-unity multiplication should be one. An overflow situation can result in a significant error. If an overflow is detected, a close approximation for the result can be obtained using a software solution. Another approach is to change the implementation of the multiplication, and use a method that enables hardware saturation. Conventional approaches have disadvantages of consuming more cycles, and therefore can degrade the performance.

It would be desirable to implement a method for avoiding overflow in roots-of-unity multiplication.

SUMMARY OF THE INVENTION

The present invention concerns an apparatus including a processor, a computer readable storage medium, and a lookup memory. The computer readable storage medium generally contains computer executable instruction that when executed by the processor perform operations involving fixed point multiplication. The lookup memory generally stores values used in the fixed point multiplication. The values stored in the lookup memory are approximated based upon a predetermined value to prevent overflow in the fixed point multiplication.

The objects, features and advantages of the present invention include providing a method and/or apparatus for avoiding overflow in roots-of-unity multiplication that may (i) use a minimum of clock cycles, (ii) be implemented without incurring software overhead, (iii) use overflow safe approximated roots-of-unity values implemented as a table, (vi) prevent overflow of multiplication using values taken from the table, and/or (v) introduce only small error in the table values.

BRIEF DESCRIPTION OF THE DRAWINGS

These and other objects, features and advantages of the present invention will be apparent from the following detailed description and the appended claims and drawings in which:

FIG. 11 is a diagram illustrating values of an example ROM table in accordance with an embodiment of the present invention.

DETAILED DESCRIPTION OF THE PREFERRED EMBODIMENTS

Figure 1:
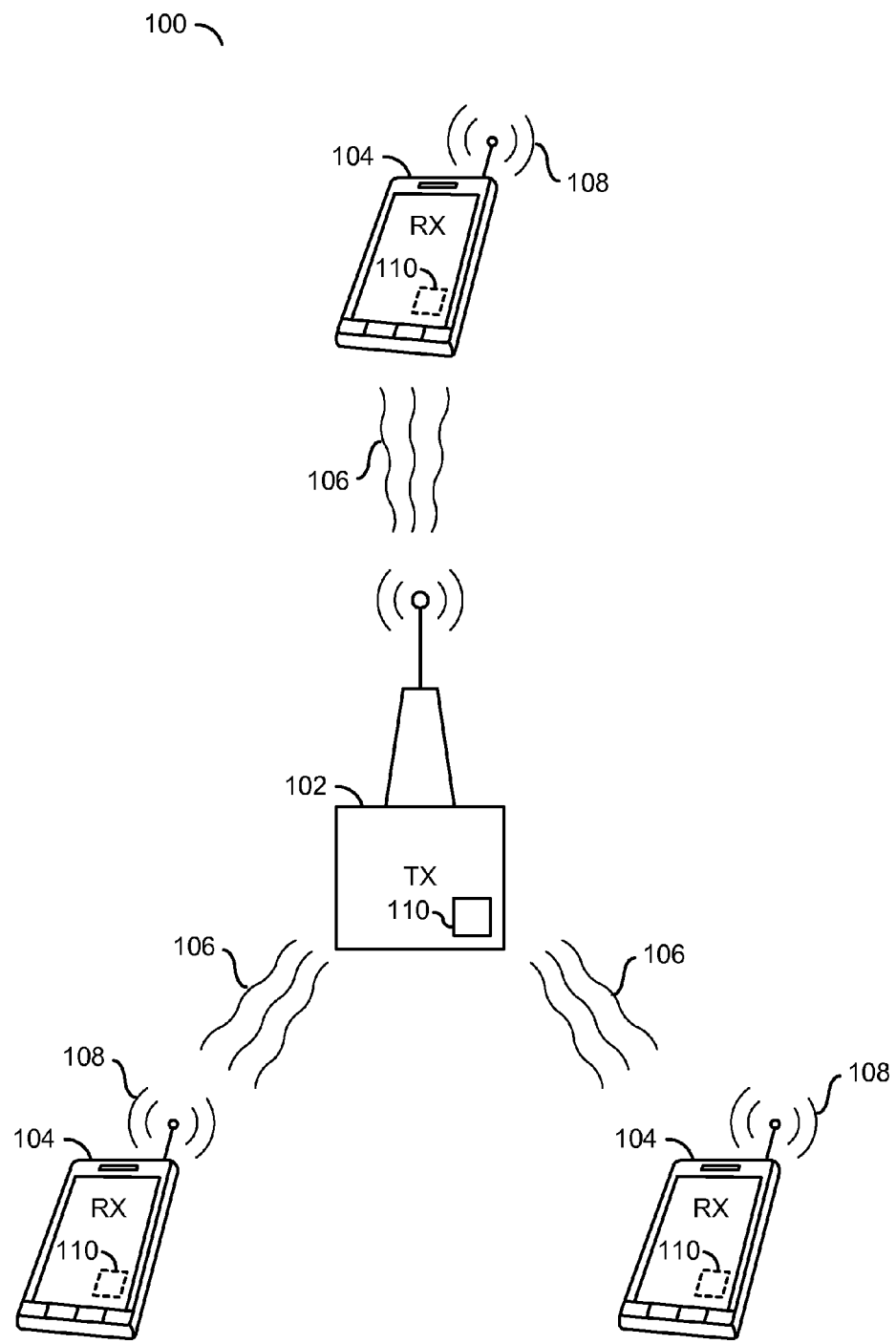
FIG. 1 is a diagram illustrating a system in which an embodiment of the present invention may be implemented.

Referring to FIG. 1, a diagram of a system 100 is shown illustrating a communications system implemented in accordance with an example embodiment of the present invention. The system 100 may implement a wireless communications system. In one example, the system 100 may implement a third generation cellular communication system compliant with the 3GPP Long Term Evolution (LTE) standard. The system 100 generally comprises at least one base station 102 and a number of mobile units 104*a*-104*n*. The base station 102 may transmit signals to the mobile units 104*a*-104*n* via a downlink channel 106. Each of the mobile units 104*a*-104*n* may transmit signals to the base stations 102 via an uplink channel 108. Each of the base stations 102 and the mobile units 104*a*-104*n* may include a processing unit 110. The processing units 110 may be configured to manage communications between the base stations 102 and the mobile units 104*a*-104*n*.

The processing unit 110 may include a lookup memory embodying a table of values that may be used in fixed-point roots-of-unity calculations performed by software executed in the processing unit 110. The values in the table of values are not generally changed during run time. In one example, the table of values may be stored in a read only memory (ROM). However, any type of memory or lookup table (LUT) may be implemented accordingly to store the table of values. For example, the table of values may be written to a Flash memory or other nonvolatile memory (e.g., programmable read only memory (PROM), erasable programmable read only memory (EPROM), electrically erasable programmable read only memory (EEPROM), bubble memory, etc.). Additionally, even volatile memory, such as dynamic random access memory (DRAM) or static random access memory (SRAM), may be used. For example, the table values may be calculated at power-up or transmitted to the apparatus, for example, at initiation or establishment of the uplink/downlink. In another example, a simple transformation of the table values may be stored in ROM that may be used to obtain the values. The values may be converted and then stored in RAM and accessed there.

Figure 2:
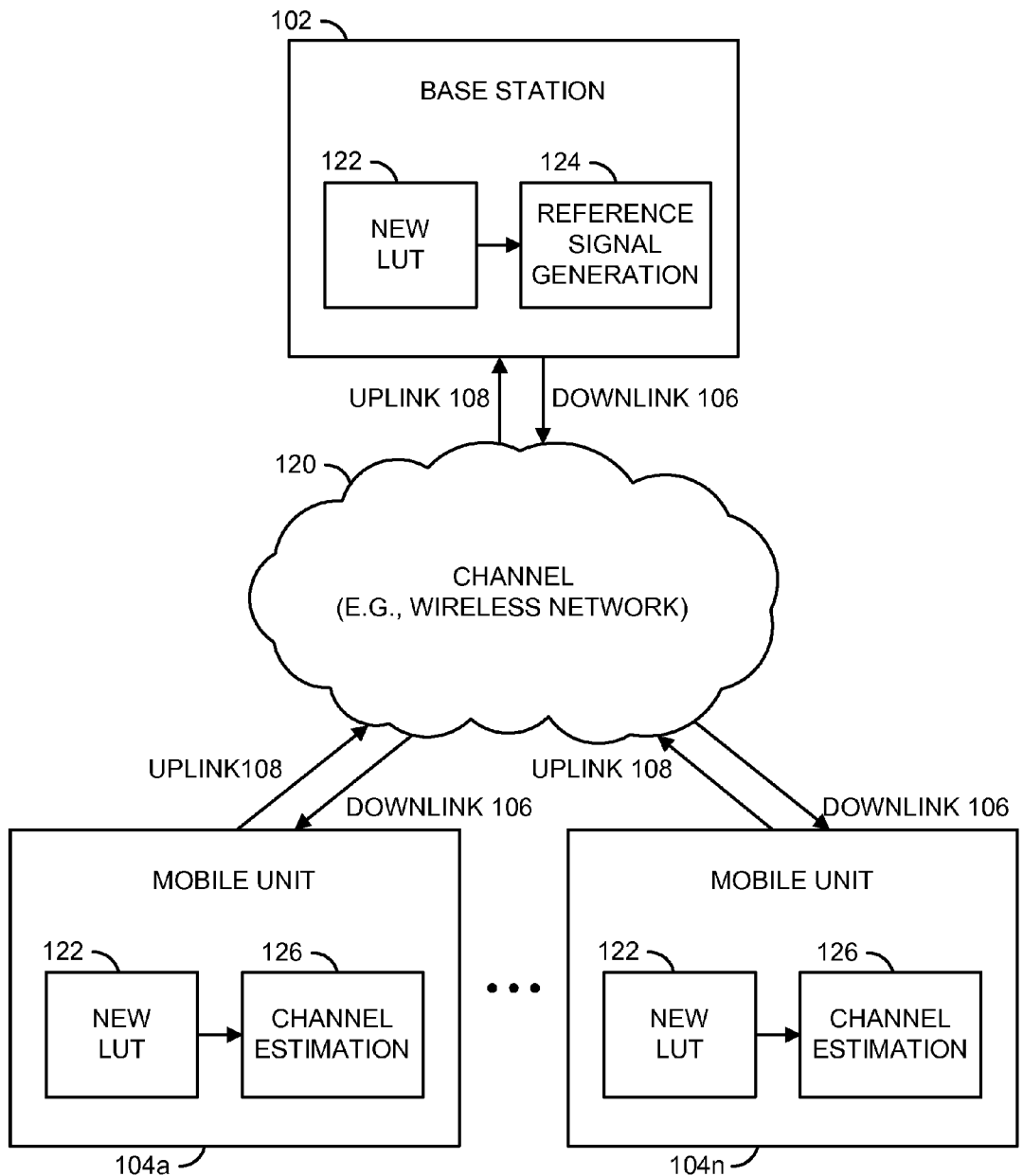
FIG. 2 is a diagram illustrating example components employed in processing a downlink reference signal.

Referring to FIG. 2, a diagram is shown illustrating example components that may be employed in processing a downlink reference signal of the system 100. In general, the base station 102 may generate a downlink reference signal that may be used, in one example, by the mobile units 104*a*-104*n* to determine a channel impulse response (CIR) of a channel of a network 120. The network 120 may be implemented, for example, as a wireless network. In one example, the network 120 may implement a cellular communications network (e.g., a 3GPP LTE network, etc.).

In one example, the reference signal may be generated as a product of an orthogonal sequence and a pseudo-random numerical (PRN) sequence. A specific reference signal may be assigned to each cell within the network 120. The specific reference signal may, for example, act as a cell-specific identifier. In one example, fixed-point roots-of-unity calculations employing values taken from a read only memory (ROM) table 122 may be used in generating the reference signal. The values in the ROM table 122 are generally implemented in accordance with an embodiment of the present invention.

Each of the mobile units 104a-104n may also include the ROM table 122. Upon reception of the downlink reference signal, the mobile units 104a-104n may perform a channel estimation operation to determine the CIR of the downlink channel. The channel estimation process may perform fixed-point roots-of-unity calculations employing values taken from the ROM table 122. The downlink reference signal transmitted from the base station 102 to the mobile units 104a-104n is generally influenced by the transmission medium (e.g., air, etc.) through which the signal passes. For example, the signal may include some echo or multi-path interference. The echo or multi-path interference may be weak, or strong, or earlier or later in time. In one example, each mobile unit 104a-104n may be configured to adjust a frequency domain equalizer based upon a result of the channel estimation process. An uplink reference signal may be implemented similarly between the mobile units 104a-104n and the base stations 102. For example, the mobile units 104a-104n may generate an uplink reference signal that may be transmitted to the base station 102. The base station 102 may examine the uplink reference signal to determine channel characteristics and adjust an equalizer accordingly.

In order to determine what the original transmitted signal was, each of the mobile units 104a-104n may estimate various characteristics of the CIR. The base station (or transmitter) 102 may send the pre-defined reference signal (e.g., DOWNLINK 106). By processing the received signal, the mobile units 104a-104n may estimate the CIR. For example, in a 3GPP LTE implementation, a Zaddof-Chu sequence may be used as a reference signal. Every LTE base station generally transmits a downlink reference signal at predetermined times. Every LTE mobile unit (or handset) generally transmits an uplink reference signal all of the time. Every LTE base station has access to the uplink reference signal. In order to transmit the reference signal (or to compare the received signal to the respective reference signal) the respective reference signal has to be generated by the processors of the base station 102 and mobile units 104a-104n.

When creating a Zaddof-Chu sequence in a certain way (e.g., using a table of sine/cosine values), an overflow problem may arise. The ROM table 122 stored memory on the processing unit 110 may be "manipulated" based upon the teachings contained herein to prevent such overflows. Other applications may include, but are not limited to, fast Fourier transforms (FFT). In one example, the ROM table 122 may implement an approximated root-of-unity table. The absolute values embodied in the table may be manipulated to be slightly smaller than 1, so that multiplications involving the values generally do not suffer from overflow. When the absolute value reduction is relatively small, any resulting error is also small. The overflow is avoided with the selection of appropriate values.

Figure 3:
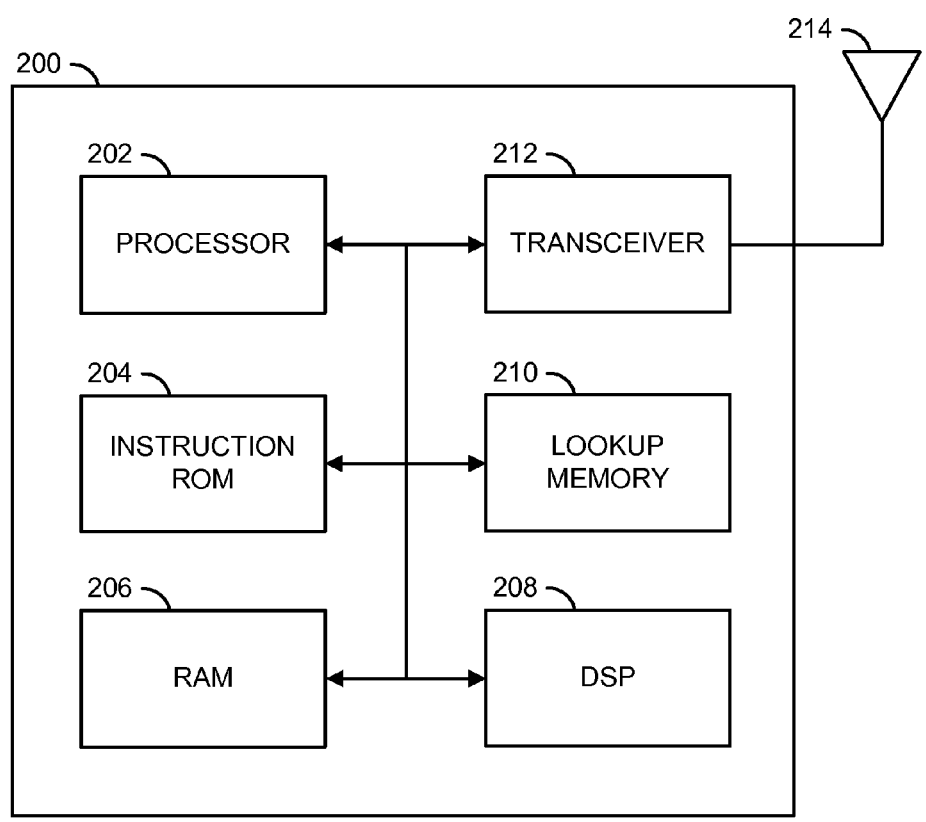
FIG. 3 is a diagram illustrating a processing unit in accordance with an example embodiment of the present invention.

Referring to FIG. 3, a block diagram is shown illustrating an example processing unit 200 that may be configured to implement fixed-point multiplication in accordance with a preferred embodiment of the present invention. In one example, the processing unit 110 of FIG. 1 may be implemented using the processing unit 200. The processing unit 200 may include, but is not limited to, a block (or module) 202, a block (or module) 204, a block (or module) 206, a block (or module) 208, a block (or module) 210, a block (or module) 212, and a block (or module) 214. The block 202 may be implemented, in one example, as an embedded processor (e.g., ARM, etc.). The block 204 may be implemented as a read only memory (ROM). The block 206 may comprise random access memory (RAM). The block 208 may implement a digital signal processor. The block 210 may implement a lookup table (LUT) or memory embodying approximated roots-of-unity values in accordance with an embodiment of the present invention. The block 212 may be implemented, in one example, as a transceiver. In another example, the block 212 may implement a transmitter and a receiver that are separate. The block 214 may implement an antenna (e.g., a cellular antenna, etc.). The block 212 may be configured to transmit and receive information via the antenna 214. The blocks 202-212 may be connected together using one or more busses. In one example, the block 204 may store computer executable instructions for controlling the processor 202 and/or the processor 208.

Figure 4:
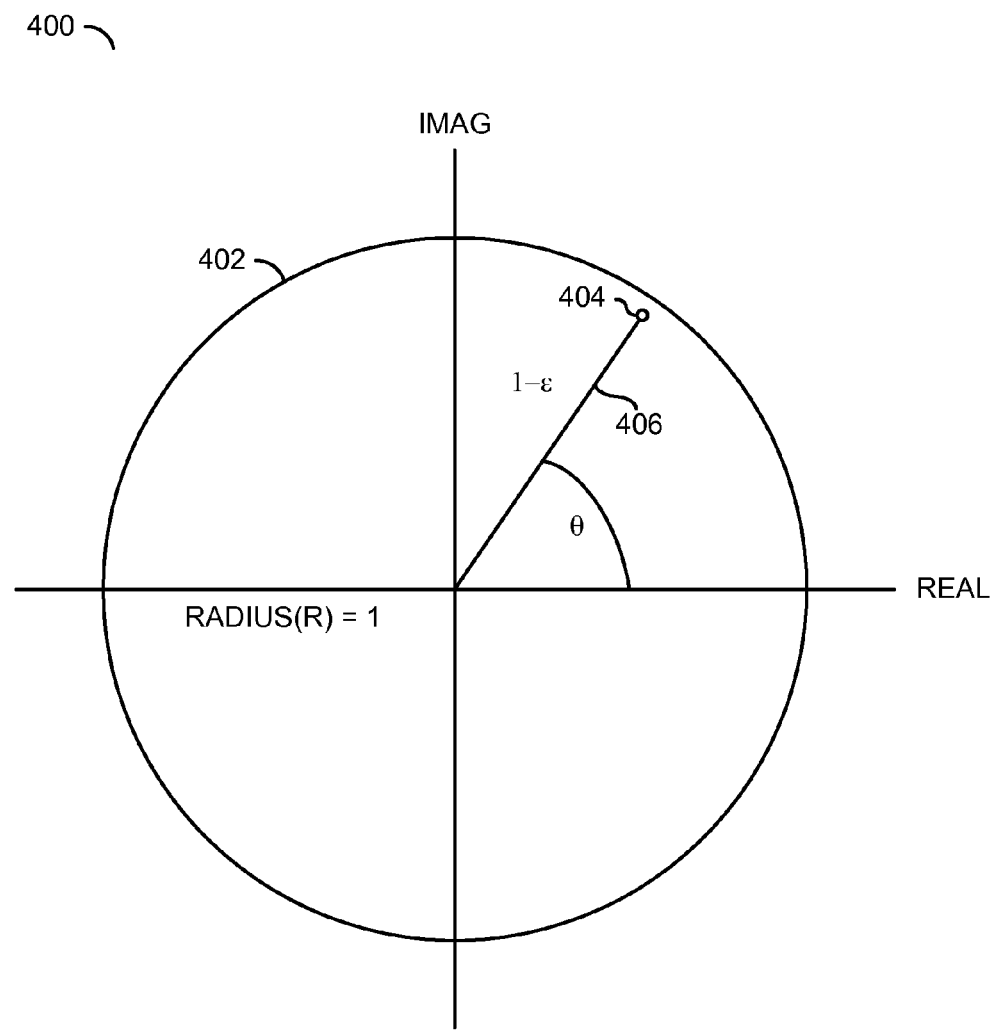
FIG. 4 is a diagram illustrating a roots-of-unity calculation in accordance with the present invention.

Referring to FIG. 4, a diagram 400 is shown illustrating a roots-of-unity value calculation method in accordance with an embodiment of the present invention. The method in accordance with an embodiment of the present invention generally prevents overflow in multiplication of fixed-point representation roots-of-unity values, with no software overhead and with only small error in the table values. In one example, the tables 122 and 210 may be created using values of the form:

$$v = \text{fixed point representation } \{Re^{i\theta}\},$$

where $R=1-\epsilon$, $0<\epsilon\ll1$, $i=\sqrt{(-1)}$, $\theta$ values may be derived from the desired value of the roots-of-unity. The value $\epsilon$ is real and generally determined so that the multiplication of 2 or more values (according to the expected implementation) will not yield an overflow. A circle 402 having a radius of 1 generally illustrates the set of all roots-of-unity. Roots-of-unity are generally represented by holding real and imaginary parts as fractional fixed-point values. An approximated root-of-unity value in accordance with an embodiment of the present invention may be illustrated as a point 404 at the end of a line 406 from the center of the circle 402, where the line 406 has a length of $1-\epsilon$. A gap between the end of the line 406 and the circle 402 generally represents the value of $\epsilon$. The absolute value of $\epsilon$ is generally chosen to be small. When the absolute value of $\epsilon$ is small, the resulting error is also small. However, the adjustment of the absolute value allows an overflow in fixed-point multiplications to be avoided.

Figure 5:
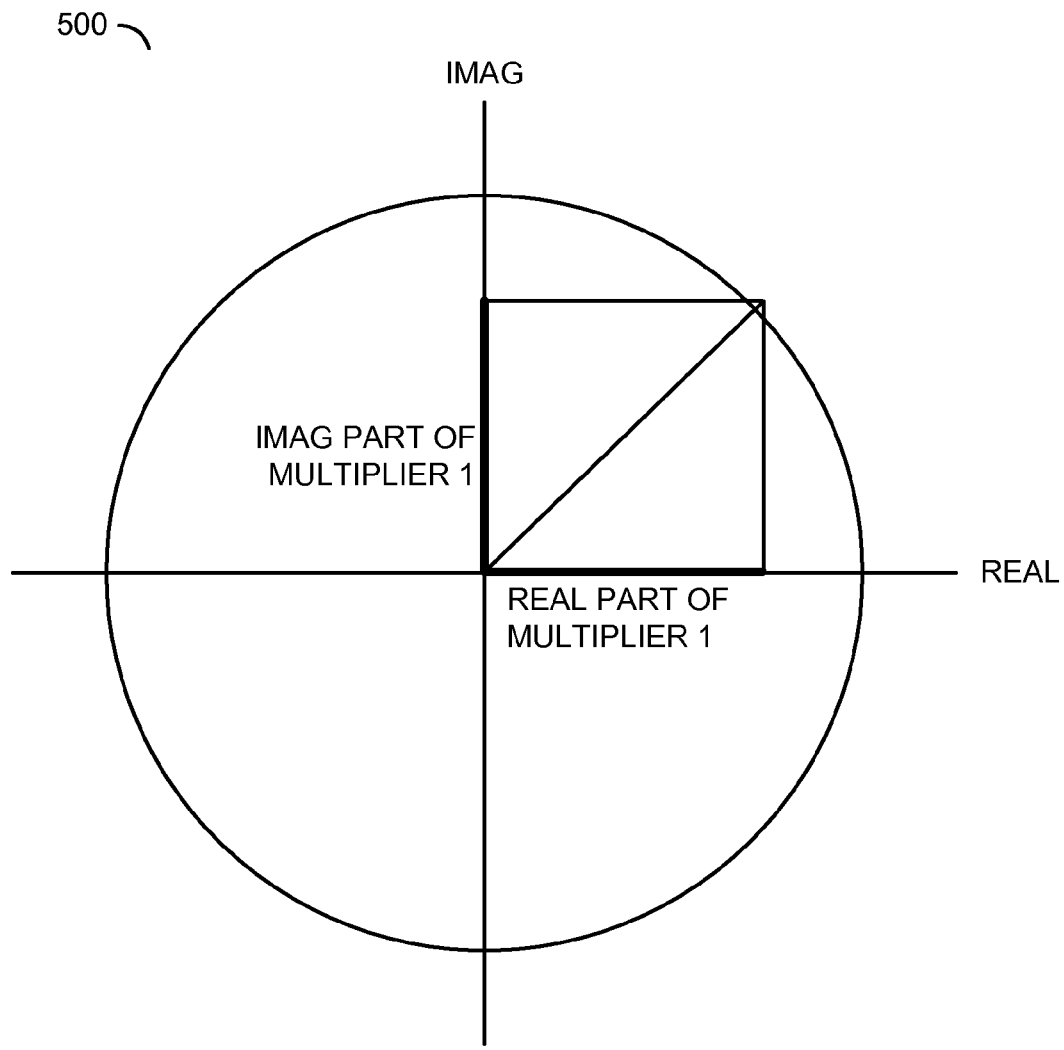
FIGS. 5-10 are diagrams illustrating numeric examples of roots-of-unity multiplication.

Referring to FIG. 5, a diagram 500 is shown illustrating an example of root-of-unity in fixed-point representation of a first multiplier where multiplication could result in an overflow. The represented number is $\exp(\pi*i*799/4096)$, represented in Q15. The imaginary part is represented by the following binary sequence:
0 1 0 0 1 0 0 1 1 0 1 0 0 0 0 0.
The real part is represented by the following binary sequence:
0 1 1 0 1 0 0 0 1 0 1 1 0 1 0 1.
Both the real part of the represented number and the imaginary part of the represented number do not suffer from overflow (e.g., both values are less than 1). However, the absolute value of the represented number is greater than 1.

Figure 6:
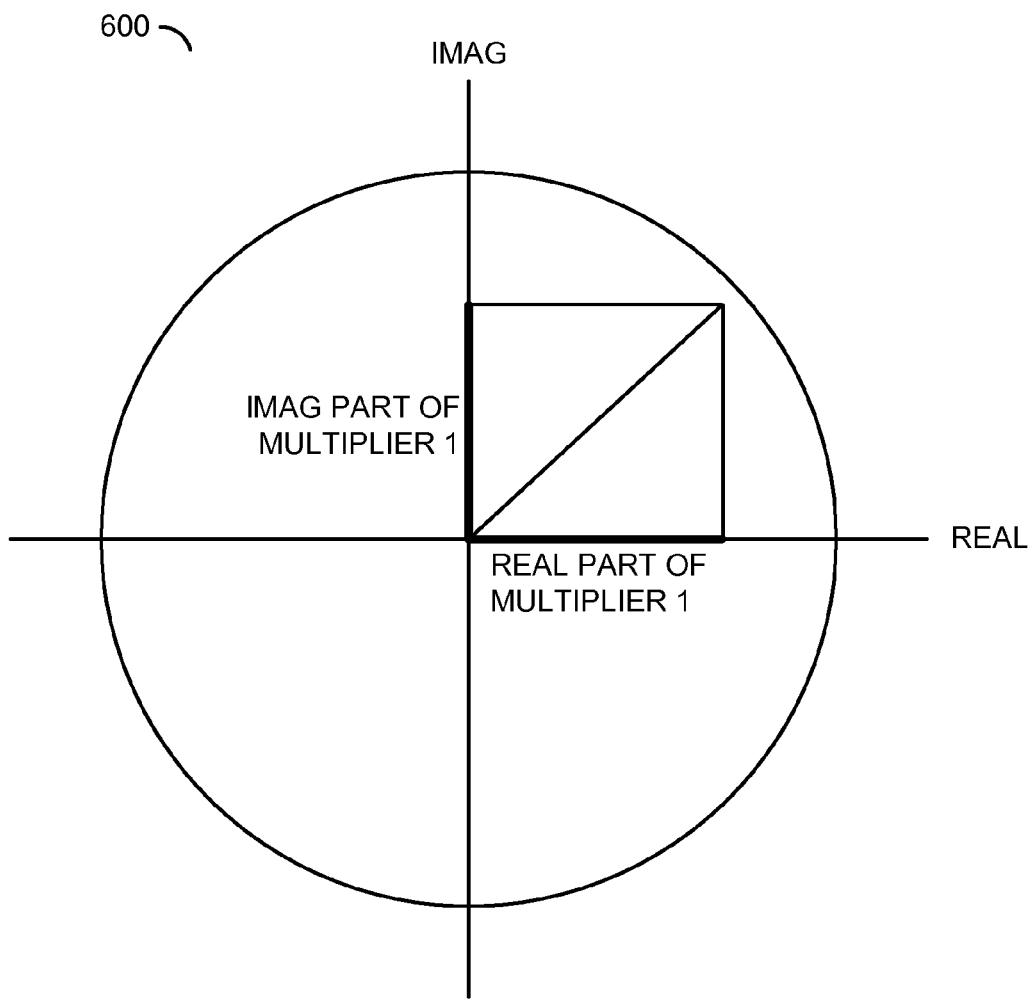

Referring to FIG. 6, a diagram 600 is shown illustrating an example root-of-unity in fixed-point representation of the first multiplier using an approximated value in accordance with an embodiment of the present invention. The represented number is $[(2^{15}-1.5)/(2^{15})]\exp(\pi*i*799/4096)$, represented in Q15. The imaginary part is represented by the following binary sequence:

0 1 0 0 1 0 0 1 1 0 0 1 1 1 1 1.

The real part is represented by the following binary sequence:

0 1 1 0 1 0 0 0 1 0 1 1 0 1 0 0.

Both the real part of the represented number, the imaginary part of the represented number, and the absolute value of the represented number do not suffer from overflow (e.g., all three values are less than 1).

Figure 7:
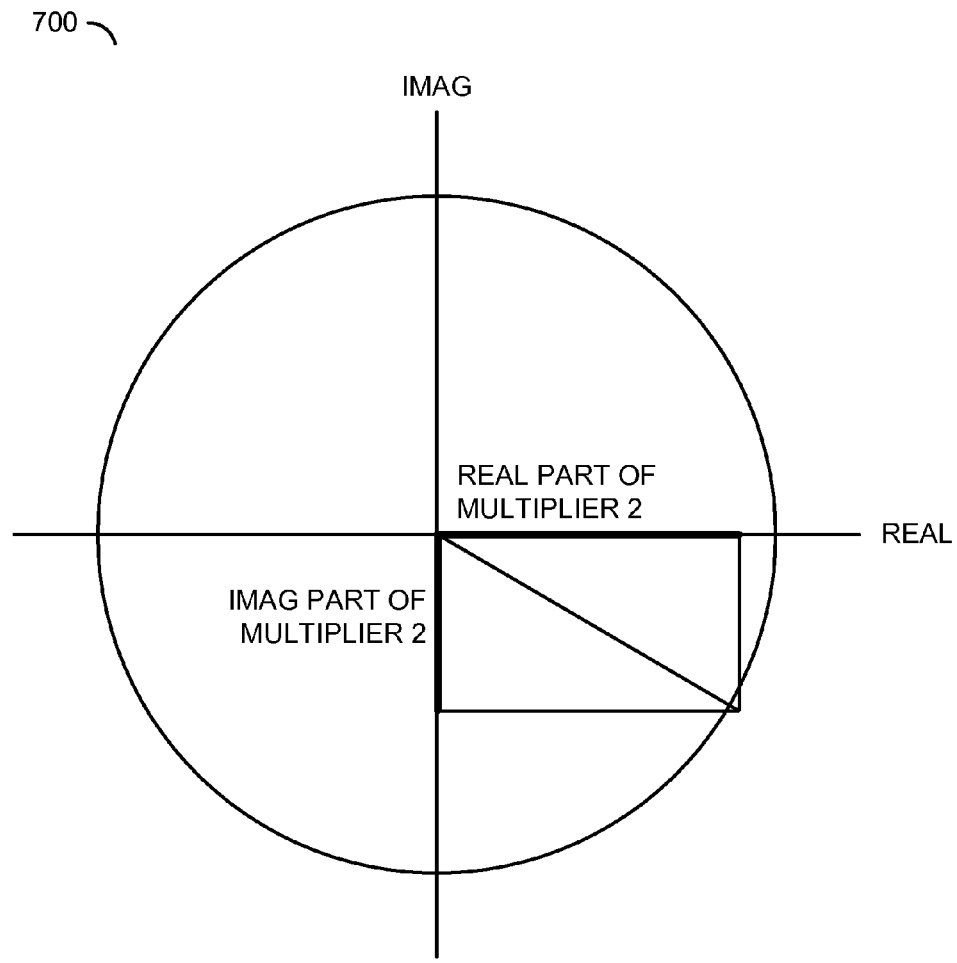

Referring to FIG. 7, a diagram 700 is shown illustrating an example of root-of-unity in fixed-point representation of a second multiplier where multiplication could result in an overflow. The represented number is $\exp((-\pi)*i*800/4096)$, represented in Q15. The imaginary part is represented by the following binary sequence:

1 0 1 1 0 1 1 0 0 1 0 0 1 1 0 0.

The real part is represented by the following binary sequence:

0 1 1 0 1 0 0 0 1 0 1 0 0 1 1 1.

Both the real part of the represented number and the imaginary part of the represented number do not suffer from overflow (e.g., both values are less than 1). However, the absolute value of the represented number is greater than 1.

Figure 8:
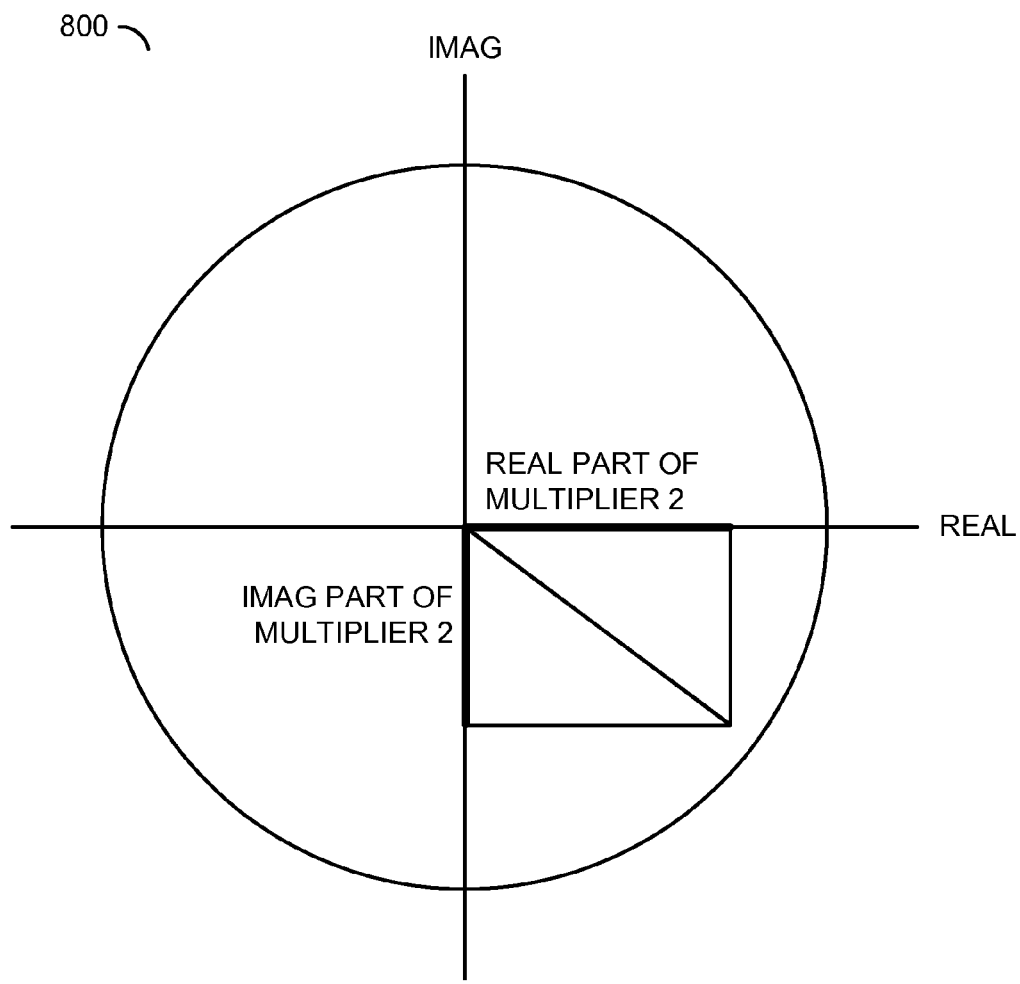

Referring to FIG. 8, a diagram 800 is shown illustrating an example root-of-unity in fixed-point representation of the second multiplier using an approximated value in accordance with an embodiment of the present invention. The represented number is $[(2^{15}-1.5)/(2^{15})]\exp((-\pi)*i*800/4096)$, represented in Q15. The imaginary part is represented by the following binary sequence:

1 1 0 1 1 0 0 1 0 0 1 1 0 1.

The real part is represented by the following binary sequence:

0 1 1 0 1 0 0 0 0 1 0 0 1 0 1.

Both the real part of the represented number, the imaginary part of the represented number, and the absolute value of the represented number do not suffer from overflow (e.g., all three values are less than 1).

Figure 9:
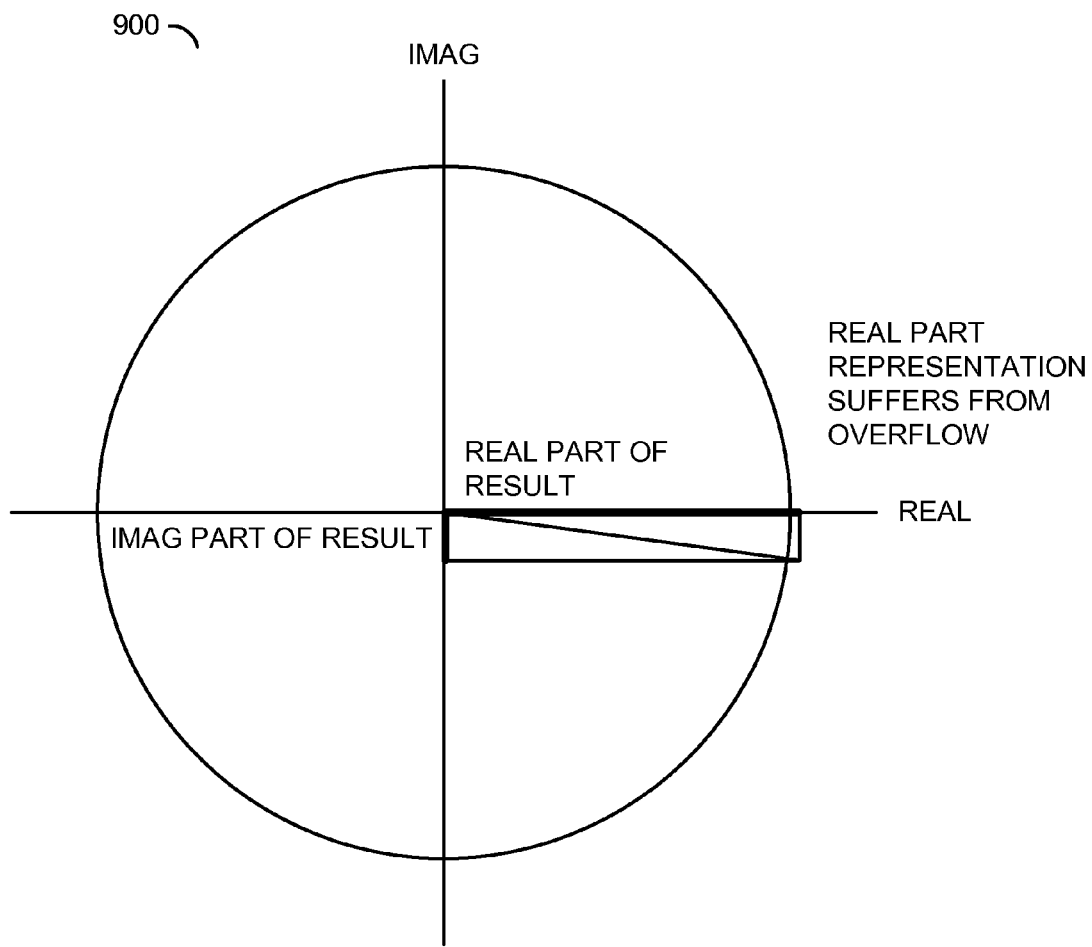

Referring to FIG. 9, a diagram 900 is shown illustrating an example result of root-of-unity fixed-point representation multiplication of the first multiplier of FIG. 5 and the second multiplier of FIG. 7. The binary signed complex fractional multiplication yields a result that is larger than 1 and, therefore, cannot be represented in Q15 using 16 bits. The real part is represented by the following binary sequence:

(1) 0 0 0 0 0 0 0 0 0 0 0 0 0 0 0 0, where the 1 in parentheses indicates the overflow bit. The imaginary part is represented by the following binary sequence:

1 1 1 1 1 1 1 1 1 1 1 1 1 1 1 1.

Figure 10:
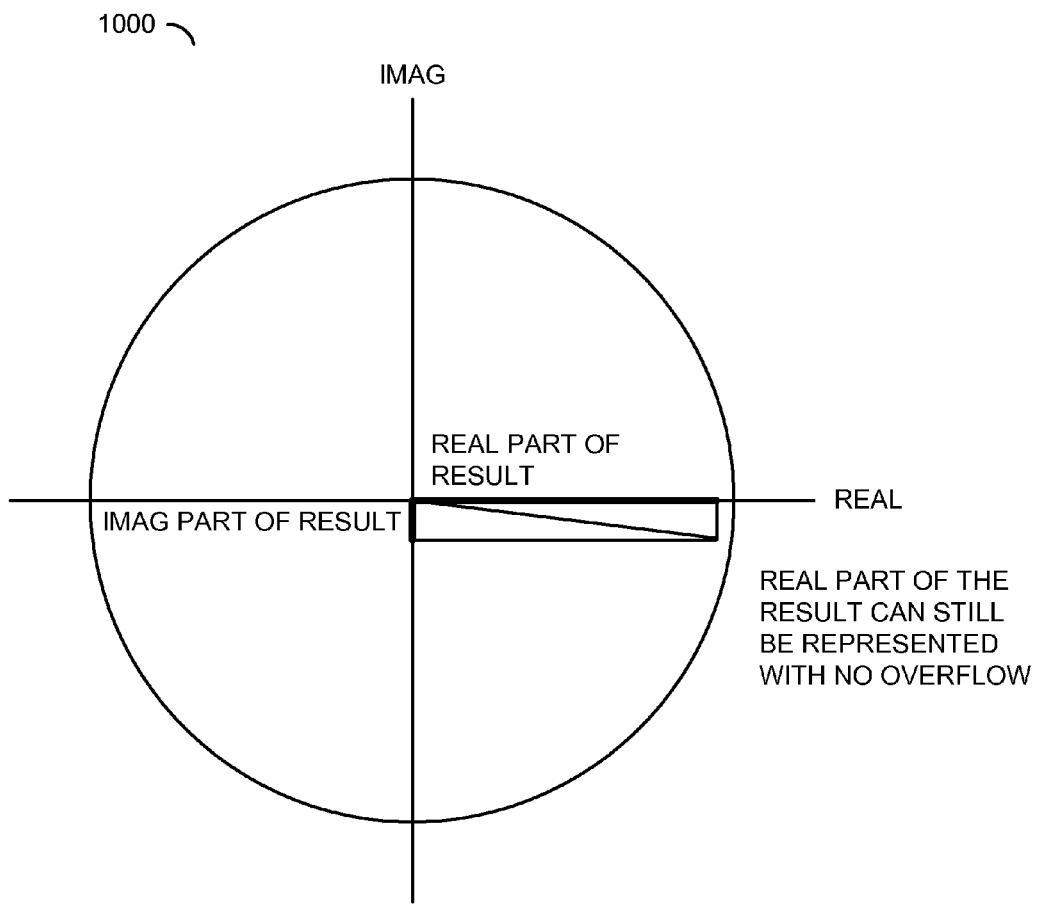

Referring to FIG. 10, a diagram 1000 is shown illustrating an example result of root-of-unity fixed-point representation multiplication of the first multiplier of FIG. 6 and the second multiplier of FIG. 8. The binary signed complex fractional multiplication yields a result that is less than 1 and, therefore, can be represented in Q15 using 16 bits. The real part is represented by the following binary sequence without overflow:

0 1 1 1 1 1 1 1 1 1 1 1 1 1 0 0.

The imaginary part is represented by the following binary sequence without overflow:

1 1 1 1 1 1 1 1 1 1 1 1 1 1 1 1.

Referring to FIG. 11, a table is shown comparing conventional fixed-point representation of root of unity values, with example approximated fixed-point representations of the root of unity values in accordance with an embodiment of the present invention.

Figure 12:
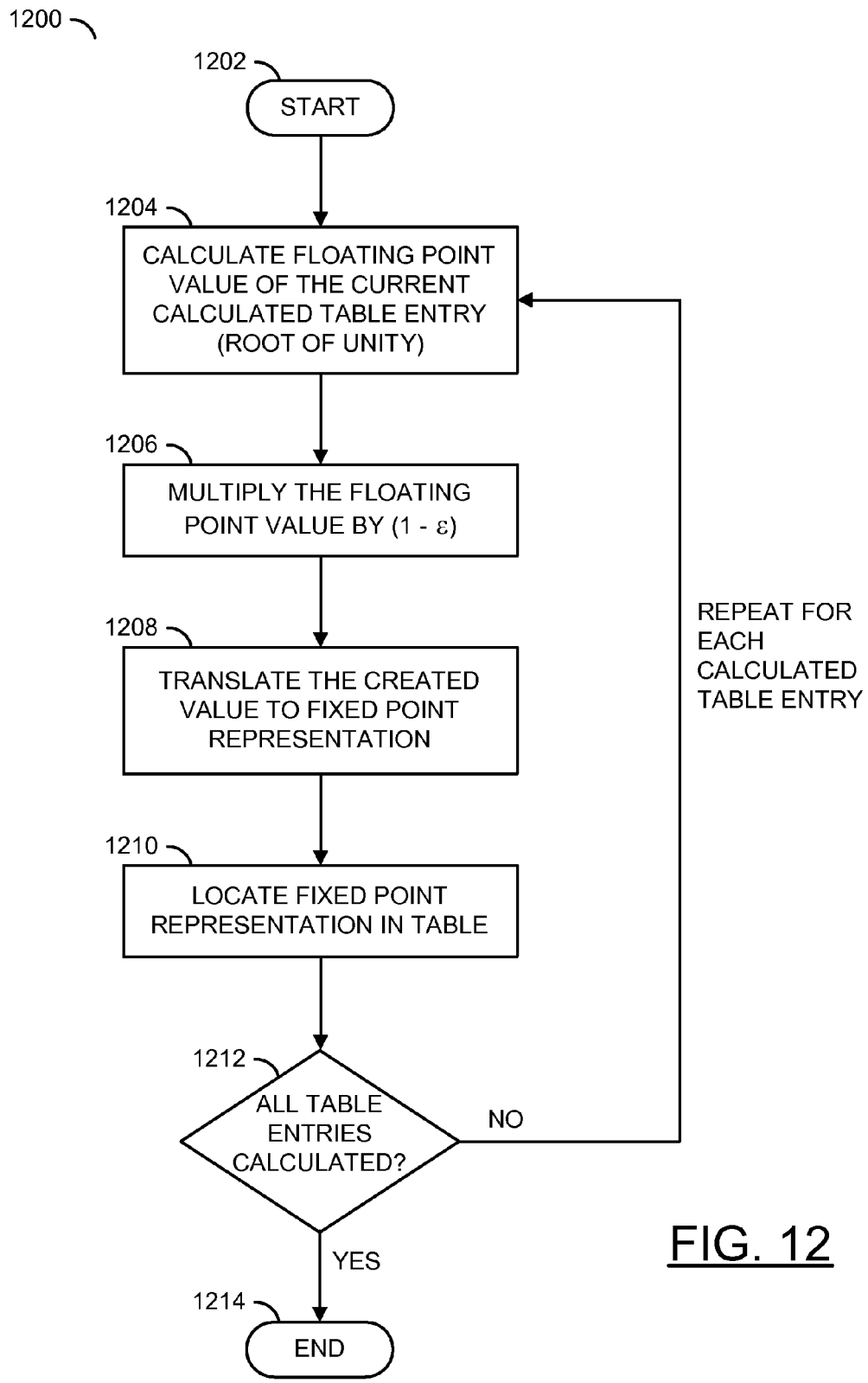
FIG. 12 is a flow diagram illustrating a process in accordance with an embodiment of the present invention.

Referring to FIG. 12, a flow diagram is shown illustrating a process 1200 in accordance with an embodiment of the present invention. The process (or method) 1200 may comprise a step (or state) 1202, a step (or state) 1204, a step (or state) 1206, a step (or state) 1208, a step (or state) 1210, a step (or state) 1212, and a step (or state) 1214. The process 1200 may begin in the state 1202 and move to the step 1204. In the step 1204, the process 1200 may calculate a floating point value of a current calculated table entry. In one example, the calculated table entry may implement an nth root of unity. When the current calculated table entry has been determined, the process 1200 may move to the step 1206.

In the step 1206, the process 1200 may multiply the floating point value by $(1-\epsilon)$, where $\epsilon$ represents a predetermined value selected to prevent overflow. When the product of the floating point value and $(1-\epsilon)$ is obtained, the process 1200 may move to the step 1208. In the step 1208, the process 1200 may translate the product from floating point into fixed-point representation. When the product is translated, the process 1200 may move to the step 1210. In the step 1210, the process 1200 may place the fixed point representation in a table. When the fixed point representation is located, the process 1200 may move to the step 1212 and determine whether more table entries need to be calculated. If more table entries need to be calculated, the process 1200 may return to the step 1204 and calculate the next value. Otherwise, the process 1200 may move to the step 1214 and end.

The functions performed by the diagrams of FIG. 12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a processor;
   a computer readable storage medium containing computer executable instruction that when executed by the processor perform operations involving fixed point multiplication; and
   a lookup memory storing fixed point representations of a plurality of roots-of-unity values, wherein said values are reduced from a true magnitude based upon a predetermined value to prevent overflow in the fixed point multiplication.

2. The apparatus according to claim 1, wherein one or both of an imaginary part and a real part of the roots-of-unity values in the lookup memory are reduced from a respective true magnitude based upon said predetermined value.

3. The apparatus according to claim 1, wherein each of the roots-of-unity values in the lookup memory are scaled to a smaller absolute value based upon an amount determined by a ratio of 1 minus the predetermined value.

4. The apparatus according to claim 1, further comprising:
   a receiver configured to receive a first reference signal generated using the values stored in the lookup memory; and
   a transmitter configured to transmit a second reference signal generated using the values stored in the lookup memory.

5. The apparatus according to claim 4, wherein said first reference signal comprises an uplink reference signal and said second reference signal comprises a downlink reference signal.

6. The apparatus according to claim 5, wherein said apparatus comprises a base station in a cellular communication system.

7. The apparatus according to claim 4, wherein said first reference signal comprises a downlink reference signal and said second reference signal comprises an uplink reference signal.

8. The apparatus according to claim 7, wherein said apparatus comprises a mobile unit in a cellular communication system.

9. The apparatus according to claim 1, further comprising:
   a second processor;
   a random access memory; and
   a transceiver, wherein said processor, said second processor, said lookup memory, said random access memory and said transceiver are connected by one or more busses.

10. The apparatus according to claim 1, wherein said operation involving fixed point multiplication comprises adjusting a frequency domain equalizer to match a channel impulse response.

11. A method of preventing overflow in an operation involving multiplication of fixed-point representations of roots of unity values, comprising the steps of:
    calculating a number of floating point values for a number of roots of unity;
    reducing the floating point values based upon a predetermined value;
    translating the reduced floating point values to fixed point representations; and
    storing a lookup table embodying the fixed point representations of the floating point reduced values in a memory device.

12. The method according to claim 11, wherein reducing the floating point values based upon a predetermine value comprises multiplying the floating point number by a ratio based upon the predetermined value and a maximum value of the fixed point representation.

13. The method according to claim 11, wherein said operation comprises adjusting a frequency domain equalizer based upon a channel impulse response.

14. The method according to claim 13, wherein said channel impulse response is estimated based upon a reference signal.

15. The method according to claim 14, wherein said reference signal comprises either a downlink reference signal or an uplink reference signal.

16. The method according to claim 14, wherein said reference signal comprises a 3GPP Long Term Evolution (LTE) compliant reference signal.

17. The method according to claim 11, wherein said operation comprises adjusting a frequency domain equalizer of a 3GPP long Term Evolution (LTE) compliant mobile unit based upon a reference signal received from a 3GPP long Term Evolution (LTE) compliant base station.

18. An apparatus comprising:
    a lookup memory embodying fixed point representations of a plurality of roots-of-unity values, wherein one or both of an imaginary part and a real part of said roots-of-unity values are reduced from a respective true magnitude based upon a predetermined value to prevent overflow in a fixed point multiplication; and
    means for processing digital signals, wherein said digital signal processing means is configured to perform fixed point multiplication using said roots-of-unity values in said lookup memory.

19. The apparatus according to claim 18, wherein said roots-of-unity values are of the form:

value = fixed point representation $\{Re^{j\theta}\}$, where $R=1-\epsilon$, $0<\epsilon\ll1$, $i=\sqrt{(-1)}$, and $\epsilon$ is real and determined such that the multiplication of two or more values does not result in an overflow.

20. The apparatus according to claim 18, wherein said apparatus is part of a cellular communications system.

* * * * *